United States Patent [19]

Bonyhard et al.

[11] E Re. 29,677

[45] Reissued Jun. 20, 1978

[54] SINGLE-WALL DOMAIN ARRANGEMENT

[75] Inventors: Peter Istvan Bonyhard, Edison; Paul Charles Michaelis, Watchung, both of N.J.

[73] Assignee: Bell Telephone Laboratories, Incorporated, Murray Hill, N.J.

[21] Appl. No.: 534,849

[22] Filed: Dec. 20, 1974

Related U.S. Patent Documents

Reissue of:

[64] Patent No.: 3,713,116
Issued: Jan. 23, 1973
Appl. No.: 196,902
Filed: Nov. 9, 1971

[51] Int. Cl.[2] ..... G11C 19/08
[52] U.S. Cl. ..... 365/15
[58] Field of Search ..... 340/174 TF, 174 SR

[56] References Cited

U.S. PATENT DOCUMENTS

| | | | |
|---|---|---|---|
| 3,613,056 | 10/1971 | Bobeck et al. | 340/174 TF |
| 3,646,529 | 2/1972 | Bobeck et al. | 340/174 TF |
| 3,806,901 | 8/1972 | Buhrer | 340/174 TF |

OTHER PUBLICATIONS

IBM Technical Disclosure Bulletin, "Improvement of Data Rate in Cylindrical Domain Devices" by Genovese et al., vol. 13, No. 11, 4/71, pp. 3299–3300.

*Primary Examiner*—James W. Moffitt
*Attorney, Agent, or Firm*—Herbert M. Shapiro

[57] ABSTRACT

The transfer of a domain from one channel to another in a single-wall domain memory is effected by a transfer loop into which a domain is moved by a field from a pulsed conductor and from which a domain exits in response to a magnetic field rotating in the plane of the layer in which domains move. The transfer loop includes two "exit-entrance" positions associated with the two channels between which transfer occurs. The exit of a domain from the transfer loop may be aided by a pulsed conductor also.

14 Claims, 9 Drawing Figures

SINGLE-WALL DOMAIN ARRANGEMENT

Matter enclosed in heavy brackets [ ] appears in the original patent but forms no part of this reissue specification; matter printed in italics indicates the additions made by reissue.

FIELD OF THE INVENTION

This invention relates to data processing arrangements and more particularly to such arangements in which information is represented as single-wall domains.

BACKGROUND OF THE INVENTION

The term "single-wall domain" refers to a magnetic domain which is movable in a layer of a suitable magnetic material and is encompassed by a single domain wall which closes on itself in the plane of that layer.

Propagation arrangements for moving a domain are designed to produce magnetic fields of a geometry determined by the layer in which a domain is moved. Most materials in which single-wall domains are moved are characterized by a preferred magnetization direction, for all practical pruposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movement of a domain in a selected direction.

One particularly attractive arrangement for providing the propagation fields is disclosed in A. H. Bobeck U.S. Pat. No. 3,534,347, issued Oct. 13, 1970. That patent describes a pattern of magnetically soft elements coupled to the layer in which domains move. The elements are of a geometry and so disposed to exhibit changing magnetic pole patterns in response to a magnetic field reorienting, typically rotating, in the plane of the layer. Domains follow the changing pole pattern from input to output positions thus realizing shift register operation in response only to the in-plane field—an operation termed "field access."

U.S. Pat. No. 3,618,054, issued Nov. 2, 1971 of P. I. Bonyhard, U. F. Gianola and A. J. Perneski discloses an organization of a domain, field-access arrangement in what is called a "major-minor" mass memory. Magnetically soft elements are arranged to define a plurality of closed "minor loops" which recirculate domain patterns in response to the in-plane field. The minor loops come in close proximity to a "major loop" arranged perpendicular to the axes of the minor loops. Information is transferred between the minor loops and the major loop at transfer positions defined where the loops are most closely spaced.

BRIEF DESCRIPTION OF THE INVENTION

The present invention relates to an arrangement for moving domains between first and second propagation paths or loops at such a transfer loop. The transfer loop is defined by magnetically soft elements to have first and second domain paths which terminate at each end at a common element. Movement of domains is in a first or second direction in the first or second path, respectively, in response to a first orientation sequence, illustratively clockwise rotation, of the in-plane field depending at which common element to the domain enters the transfer loop. Entrance of a domain at the first or second common element of the loop depends on timely pulses in conductors positioned to displace a domain moving at least partially thereunder. A domain moving in a channel from which transfer is to occur is displaced, by the field generated by the pulse, to a pole in the associated common element alternative to that to which the domain would normally move next when the in-plane field reorients.

DETAILED DESCRIPTION

Figure 1:
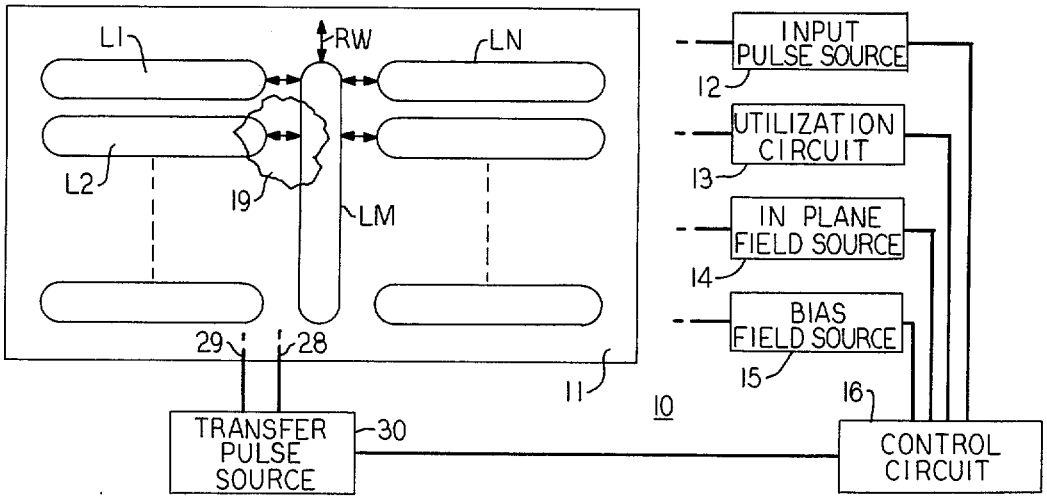
FIG. 1 is a line diagram of a single-wall domain memory including a transfer region in accordance with this invention.

FIG. 1 shows a single-wall domain memory organization 10 comprising a layer of material 11 in which single-wall domains can be moved. Domains are moved in layer 11 along channels defined by elements of magnetically soft material, typically deposited by photolithographic techniques as an overlay on a suitable spacing layer (not shown) on the surface of layer 11. The elements are of geometries and so disposed with respect to one another to exhibit moving pole patterns in response to a rotating inplane magnetic field to propagate domains in parallel in closed minor loops organized in right and left sets as represented by the oval-shaped loops designated merely L1 - LN for convenience.

The overlay elements also define a single major loop shown as a vertically oriented oval-shaped loop LM in FIG. 1. As is well known, information is recirculated in the minor loops for transfer of selected date (a bit from each minor loop) to the major loop where the data is advanced to a read-write position designated by double-headed arrow RW in FIG. 1. The selected data, illustratively, is returned thereafter to associated vacancies created in the minor loops by the initial transfer. The data in the major loop as well as in the minor loops is moved responsive to the in-plane field rotations and thus is synchronized by that field so that selected data is returned to the original positions in minor loops simply by the occurrence of a data return transfer operation at the appropriate number of field rotations after an initial data transfer operation.

An input pulse source represented by block 12 in FIG. 1 and a utilization circuit represented by block 13 are coupled to a read-write position for operation as described in the above-mentioned patent of P. I. Bonyhard et al. An in-plane field source is represented by block 14 in FIG. 1. In practice, a magnetic bias field represented by block 15 in FIG. 1 maintains domains in layer 11 at a specified diameter as is well known.

Sources 12, 14, and 15, and circuit 13 are connected to a control circuit represented by block 16 in FIG. 1 for synchronization and activation. The various sources and circuits may be any such elements capable of operating in accordance with this invention.

Figure 2:
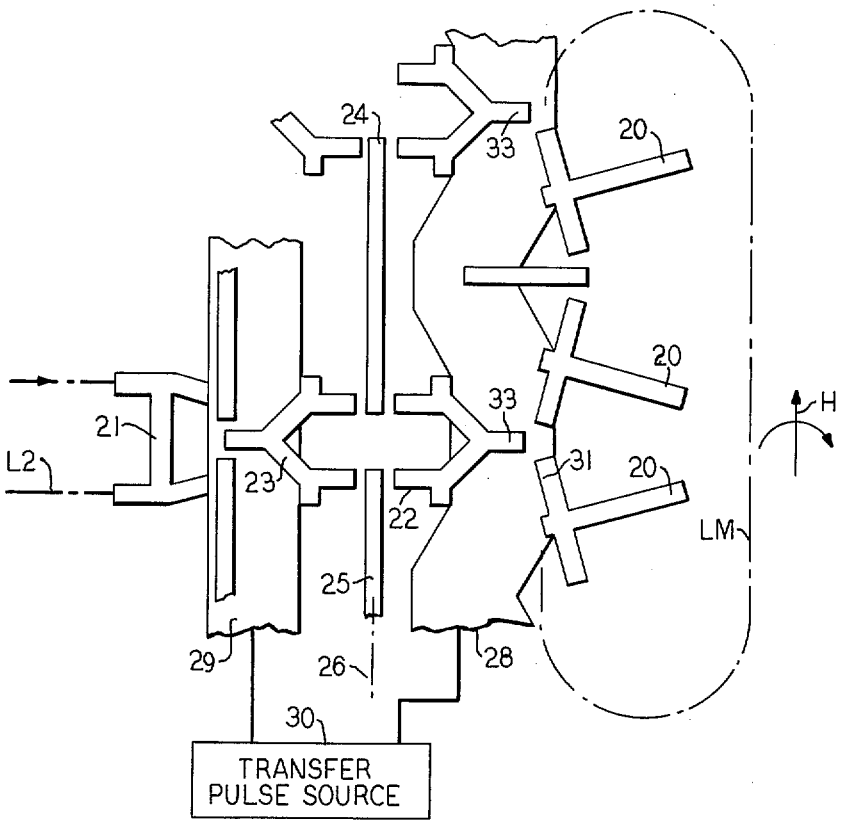
FIGS. 2 through 7 are schematic representations of portions of the transfer region of FIG. 1.

The transfer of information (data) in major-minor arrangements occurs at transfer positions defined by magnetically soft elements in the region where each minor loop is most closely spaced from an associated stage of the major loop. A representative transfer region is located at 19 in FIG. 1 and shown in detail in FIG. 2. The elements 20 form part of the major loop LM which is indicated by the broken closed arrow so designated in FIG. 2. The element 21 forms a part of the representative minor loop L2 which is indicated by the broken arrow so designated. A transfer position in accordance with this invention comprises a loop which includes these loop-defining elements plus the remaining elements therebetween as shown in FIG. 2.

The remaining elements can be seen to be generally of Y and bar-shaped geometries. The Y-shaped elements 22 and 23 are most closely associated at their basis with loops LM and L2 respectively and actually define domain positions in those channels. The Y-shaped elements also are noted to be positioned in a mirror image arrangement about bar-shaped elements 24 and 25 spaced apart along a vertical axis 26 as shown in FIG. 2.

Electrical conductors 28 and 29 couple layer 11 of FIG. 1 along the positions also coupled by the Y-shaped elements 22 and 23, respectively, for all the transfer positions to at least one side and typically both sides of the major loop. Conductors 28 and 29 are connected to a transfer pulse source 30 as shown in FIGS. 1 and 2.

The transfer loop defined by elements 22, 23, 24, and 25 will now be shown operative responsive to a pulse on conductor 28 to transfer a domain from the major loop into minor loop L2 within two propagation cycles (viz: two rotations of the in-plane field). The loop will also be shown operative in response to a pulse on conductor 29 to move a domain from minor loop L2 into the major loop within two propagation cycles.

Figure 3:
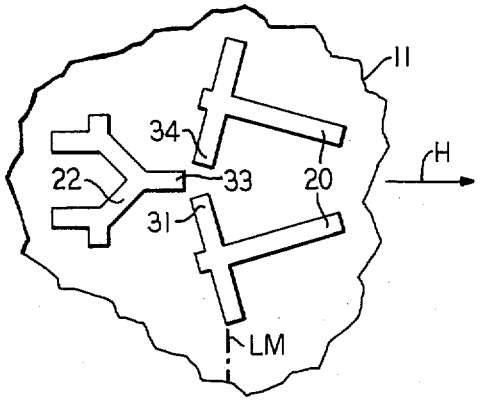
Figure 4:
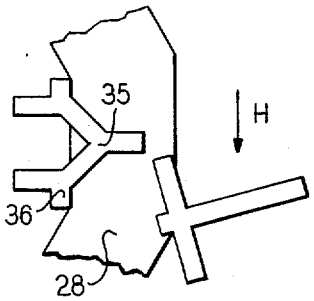

Consider a domain moving clockwise about loop LM in FIG. 2 and arriving at position 31 of an element 20 associated with the representative transfer loop as shown in FIGS. 2 and 3. The in-plane field is directed upward at this juncture as indicated by the arrow H in FIG. 2. The inplane field next reorients to the right as indicated by the arrow H in FIG. 3. The domain, in response, moves to position 33 at the base of Y-shaped element 22 shown in FIG. 3. The next normal position for a domain moving in loop LM would be position 34 in FIG. 3 attained when the in-plane field reorients to a downward direction. However, here pulse source 30 applies a pulse to conductor 28 while the domain is in position 33. The pulse generates a field which moves the domain to position 35 of FIG. 4. Thus, when the in-plane field next reorients to a downward direction as shown by arrow H in FIG. 4, the domain moves to position 36 there instead of position 34.

Figure 5:
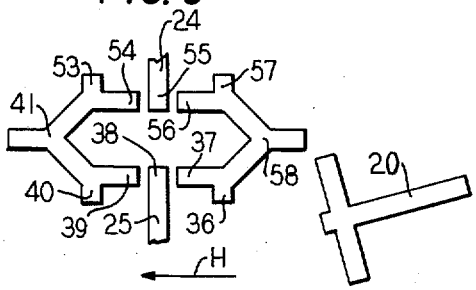

Clockwise rotation of the in-plane field through one and a half cycles of operation commencing with the movement of a domain to position 33 moves the domain further into the succession of positions 37, 38, 39, 40, and 41 as shown in FIG. 5. At this juncture, transfer pulse source 30 of FIGS. 1 and 2 illustratively applies a pulse to conductor 29 for moving the domain from position 41 to a position 42 in FIG. 6.

Figure 6:
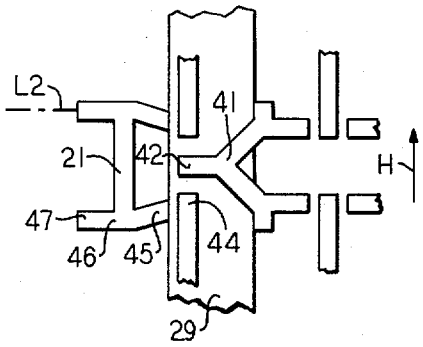

Rotation of the in-plane field to an upward direction as indicated by the arrow H in FIG. 6 results in the movement of the domain to position 44. The domain is now positioned for movement into the succession of positions 45, 46, 47, etc., in minor loop L2 for clockwise movement thereabout in response to subsequent cycles of the in-plane field.

The illustrative transfer of a domain from major loop LM to a representative minor loop L2 has now been shown.

The transfer of a domain from the representative minor loop to the major loop is entirely analogous to the above transfer operation illustratively employing a pulse in each of two conductors one and a half cycles of the in-plane field apart. In this instance also, the in-plane field rotates in the clockwise direction described but the transferred domain moves about the upper leg of the transfer loop of FIG. 2 rather than the lower leg as described above.

Figure 7:
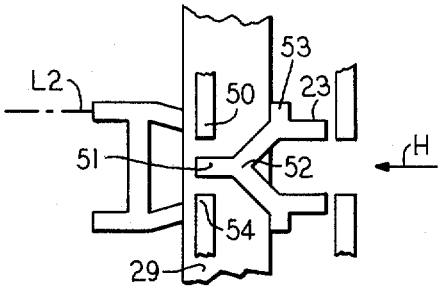

FIG. 7 identifies a position 50 which a domain occupies during normal movement clockwise in loop L2. When the in-plane field next reorients to a leftward direction as indicated by arrow H in FIG. 7, the domain moves to position 51 at the base of Y-shaped element 23.

At this juncture, transfer pulse source 30 applies a pulse to conductor 29 resulting in the movement of the domain to position 52. When the field next reorients to an upward direction, the domain moves to position 53 rather than to a next normal position 54. The next one and a half cycles of the in-plane field moves the domain through the succession of positions 54, 55, 56, 57, and 58 as shown in FIG. 5.

Source 30 applies a pulse to conductor 28, at this juncture, resulting in the movement of the domain to position 33 of FIG. 3 for movement to position 34 in FIG. 3 when the in-plane field next reorients downward. Note that the polarity of the pulses in conductors 29 and 28 for movement of a domain from the minor loop to the major loop is opposite to those applied for movement of the domain in the opposite direction. Source 30 is considered to include circuitry operative in a suitable manner.

The transfer of a domain from a representative minor loop to the major loop has now been shown. It should be remembered, however, that conductors 28 and 29 couple all the transfer loops of FIG. 1. Since the in-plane field synchronizes domain movement in all the major and minor loops, the pulsing of those conductors results in the simultaneous movement of all domains occupying domain positions at transfer loops when a transfer pulse occurs. Thus, a bit from each minor loop is transferred to an associated stage of the major loop. An absence of a domain in any of those domain positions is, of course, similarly "transferred." Thus, a domain pattern representative of a binary word is transferred during the transfer operation leaving "bit" vacancies in each minor loop for synchronous movement by the in-plane field.

A binary word is similarly transferred from the major loop. But due to the geometrical requirements of the elements and the spacing between minor loops, adjacent positions 33 are spaced two stages apart as is clear from FIG. 2. Thus, only every other stage of the major loop is occupied in the illustrative embodiment as is consistent with prior art thinking.

The illustrative arrangement employs a sequence of two pulses to achieve the transfer operation. On the other hand, only one conductor need be pulsed to move a domain into the transfer position for automatic egress when the inplane field moves the domain to the opposite "entrance-exit" position (viz: positions 33 and 51 of FIGS. 3 and 7). This is clear from FIG. 7 where it may be appreciated that a domain would "prefer" to occupy position 51 rather than position 52. In this mode of operation a transfer conductor is pulsed for gating a domain into a transfer loop at one of two entrance-exit positions therein for movement along an upper or lower leg of the transfer loop for automatic egress at the other of the two entrance-exit positions.

Figure 8:
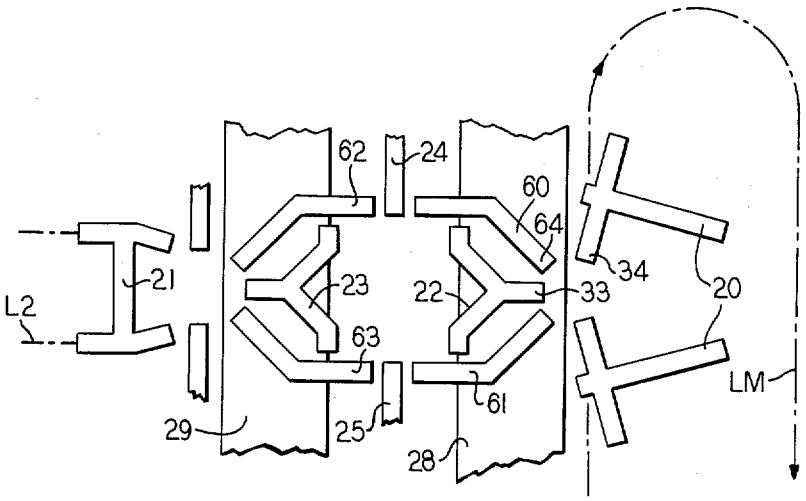
FIGS. 8 an 9 are schematic representations of alternative transfer regions for the memory of FIG. 1.

This "single pulse" transfer operation can be enhanced by modifications in the geometry of the pattern of magnetically soft elements. FIG. 8, for example, shows an alternative pattern for defining a transfer loop.

To be specific, FIG. 8 shows an alternative pattern of magnetically soft elements for defining a transfer loop between elements 20 of major loop LM and element 21 of minor loop L2. The Y-shaped elements 22 and 23 and elements 24 and 25 of FIG. 2 are seen to have their counterparts in this embodiment leading to an operation analogous to that already described.

On the other hand, additional elements 60, 61, 62, and 63 are shown in FIG. 8. These elements are operative to provide an intermediate position 64 between positions 33 and 34, for example, when the in-plane field reorients from a rightward direction to a downward direction as is the case when exit from the transfer loop to the major loop occurs. The existence of the intermediate position ensures the exit of the domain with relatively high operating margins. Conductors 28 and 29 are pulsed for transfer from the major to the minor loops and for transfer from the minor loops to the major loops, respectively, in the manner described above.

Figure 9:
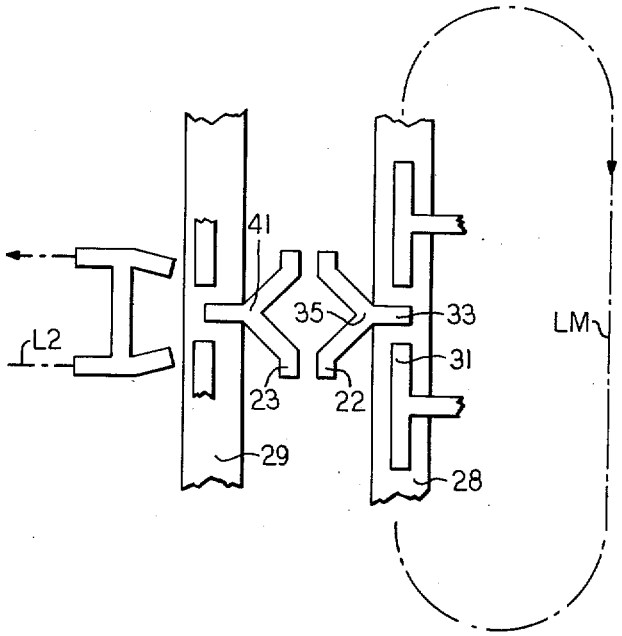

FIG. 9 shows a pattern of elements which define a transfer loop requiring fewer than two cycles for a complete transfer. A domain in this embodiment moves from position 35 to position 41 in one half cycle of the in-plane field rotation. Both conductors are pulsed herein as in the embodiment described in connection with FIGS. 2 through 7.

Like designations are used for like elements in the various embodiments to emphasize the similarity therebetween.

What has been described herein is considered merely illustrative of the principles of this invention. Therefore, various modifications can be devised by those skilled in the art in accordance with those principles within the spirt and scope of this invention. For example, the number of cycles required for traversing the transfer positions may be varied as well as the number of pulses as is clear from the described embodiments.

What is claimed is:

1. A magnetic arrangement comprising a layer of material in which single-wall domains can be moved, a pattern of magnetically soft elements for defining a path for moving a domain therealong to a first or a second position in response to a reorienting in-plane field, said elements also defining first and second propagation channels associated with said first and second positions, respectively, said elements at each of said first and second positions being adapted such that a domain moving in said path to one of said first or second positions moves into the associated channel in response to said in-plane field, and first and second conductor means coupled to said layer at said first and second positions for selectively moving a domain from said first and second channels respectively into said path.

2. A magnetic arrangement comprising a layer of material in which single-wall domains can be moved, a pattern of magnetically soft elements for defining a path for moving a domain therealong to a first or a second position in response to a reorienting in-plane field, said elements also defining first and second propagation channels associated with said first and second positions, respectively, said elements at each of said first and second positions being adapted such that a domain moving in said path to one of said first or second positions moves into the associated channel in response to said in-plane field, first conductor means coupled to said layer at one of said first or second positions for selectively moving a domain from said first or second channels there into said path, and second conductor means coupled to said layer at the other of said first or second positions for selectively moving a domain from said path into said first or second channel.

3. An arrangement in accordance with claim 2 including means for pulsing said first and second conductors in a timed sequence for moving a domain to and removing a domain from said path.

4. An arrangemnt in accordance with claim 2 wherein the elements defining said path are of a geometry such that two cycles of aid rotating field move a domain from said first to said second position and said pulses on said first and second conductors are timed one and one-half cycles apart.

5. An arrangement in accordance with claim 4 wherein said path comprises first and second legs between said first and second positions, said elements defining said legs being of a geometry to move a domain introduced at said first and second positions along said first and second legs, respectively.

6. An arrangement in accordance with claim 2 wherein the elements defining said path are of a geometry such that one cycle of said rotating field moves a domain from said first to said second position and said pulses on said first and second conductors are timed one-half cycle apart.

7. An arrangement in accordance with claim 6 wherein said path comprises first and second legs between said first and second positions, said elements defining said legs being of a geometry to move a domain introduced at said first and second positions along said first and second legs, respectively.

8. An arrangement in accordance with claim 2 wherein the elements defining said path and said first or second channels at said first or second positions respectively define domain positions corresponding to first and second orientations of said field in each cycle thereof, also including auxiliary elements at said first and second positions for defining a domain position intermediate said domain positions for said first and second orientations of said field.

9. An arrangement in accordance with claim 2 wherein said path is a closed loop.

10. An arrangement in accordance with claim 9 wherein each of said first and second channels is a closed loop for recirculating information thereabout.

11. A magnetic memory including a plurality of arrangements each in accordance with claim 10 wherein said first conductor means includes an electrical conductor coupled to said layer at one of said first or second positions of each of said arrangements.

12. A magnetic memory in accordance with claim 11 also including a second electrical conductor coupled to the other of said first or second positions of each of said arrangements.

*13. A rapid access cylindrical magnetic domain memory comprising*

*a plurality of main storage loops and an auxiliary loop, each loop being formed of a plurality of bars of highly permeable material in close proximity to a thin magnetic cylindrical domain sustaining platelet,*

*a magnetic domain sustaining structure including means for producing a bias magnetic field applied transverse to a surface of the platelet for stable cylindrical domains and means producing a rotating magnetic field within the plane of the thin platelet to drive the cylindrical domains from bar to bar,*

*said auxiliary loop having at least partially separate infeed and outfeed transfer tracks with one of said infeed and one of said outfeed transfer tracks being coupled to each of the main storage cylindrical domain circulating loops,*

*said auxiliary loop having a number of bit positions selected to accommodate a predetermined whole multiple of the number of bits transferred from each main storage loop, and further having a number of bit positions selected to provide domain position synchronization between the auxiliary loop and each main storage loop, and*

*a cylindrical domain detector arranged to detect domains in the auxiliary loop.*

*14. The rapid access cylindrical magnetic domain memory as claimed in claim 13 and further including*

*a conductor pattern deposited on the platelet with selective proximity to predetermined bars to form domain path switches actuated by current pulses applied to the conductor pattern.*

* * * * *